(12) United States Patent
Maglaty

(10) Patent No.: US 9,309,058 B2
(45) Date of Patent: Apr. 12, 2016

(54) TRANSFER CONVEYOR ARRANGEMENT AND CONTROL

(71) Applicant: Intelligrated Headquarters, LLC, Mason, OH (US)

(72) Inventor: Jonathan Louis Maglaty, Lebanon, OH (US)

(*) Notice: Subject to any disclaimer, the term of this patent is extended or adjusted under 35 U.S.C. 154(b) by 162 days.

(21) Appl. No.: 14/211,338

(22) Filed: Mar. 14, 2014

(65) Prior Publication Data

US 2014/0277700 A1    Sep. 18, 2014

Related U.S. Application Data

(60) Provisional application No. 61/790,278, filed on Mar. 15, 2013.

(51) Int. Cl.
| | | |
|---|---|---|
| *G06F 7/00* | (2006.01) | |
| *B65G 43/10* | (2006.01) | |
| *B65G 47/54* | (2006.01) | |
| *B07C 3/08* | (2006.01) | |
| *B07C 5/36* | (2006.01) | |

(52) U.S. Cl.
CPC . *B65G 43/10* (2013.01); *B07C 3/08* (2013.01); *B07C 5/36* (2013.01); *B65G 47/54* (2013.01)

(58) Field of Classification Search
USPC .......................................................... 700/230
See application file for complete search history.

(56) References Cited

U.S. PATENT DOCUMENTS

| 8,770,377 B2 | 7/2014 | Seger et al. | |
|---|---|---|---|
| 2002/0185358 A1* | 12/2002 | Zeitler | B65G 47/52 198/370.02 |
| 2009/0065330 A1* | 3/2009 | Lupton | B65G 43/08 198/357 |
| 2010/0322473 A1* | 12/2010 | Taylor | B65G 43/10 382/103 |

FOREIGN PATENT DOCUMENTS

| EP | 0209116 | 1/1987 |
|---|---|---|
| EP | 0418259 | 3/1991 |
| JP | H09-124144 A | 5/1997 |
| JP | H10-59533 A | 3/1998 |
| WO | WO 89/10318 | 11/1989 |

OTHER PUBLICATIONS

International Search Report and Written Opinion dated Aug. 19, 2014 for Application No. PCT/US2014/027420.
U.S. Appl. No. 61/718,564, filed Oct. 25, 2012.

* cited by examiner

*Primary Examiner* — Kyle Logan

(57) ABSTRACT

A routing module capable of conveying incoming articles from a plurality of infeed conveyor zones to a plurality of discharge conveyors is controlled efficiently to avoid gridlock. The control logic may consider upstream fullness and downstream fullness conditions. Articles may be conveyed to alternative destinations to avoid upstream articles from being delayed due to the lack of availability of the desired destination path for an article.

21 Claims, 6 Drawing Sheets

TRANSFER CONVEYOR ARRANGEMENT AND CONTROL

This application claims priority from U.S. Provisional Patent Application Ser. No. 61/790,278, filed on Mar. 15, 2013, the disclosure of which is incorporated herein by reference in its entirety.

TECHNICAL FIELD

The present disclosure relates generally to an improvement in controlling material handling systems having conveying lines that intersect, and is particularly directed to an apparatus and method which controls the release of articles into the intersection such that articles are conveyed efficiently and gridlock is avoided. The innovation will be specifically disclosed in connection with a subsystem of a material handling system which includes four intersecting conveyors at an intersection of four transfer conveyors controlled by a processor.

BRIEF DESCRIPTION OF THE DRAWINGS

The accompanying drawings illustrate embodiments, and, together with specification, including the detailed description which follows, serve to explain the principles of the present invention.

Figure 1:
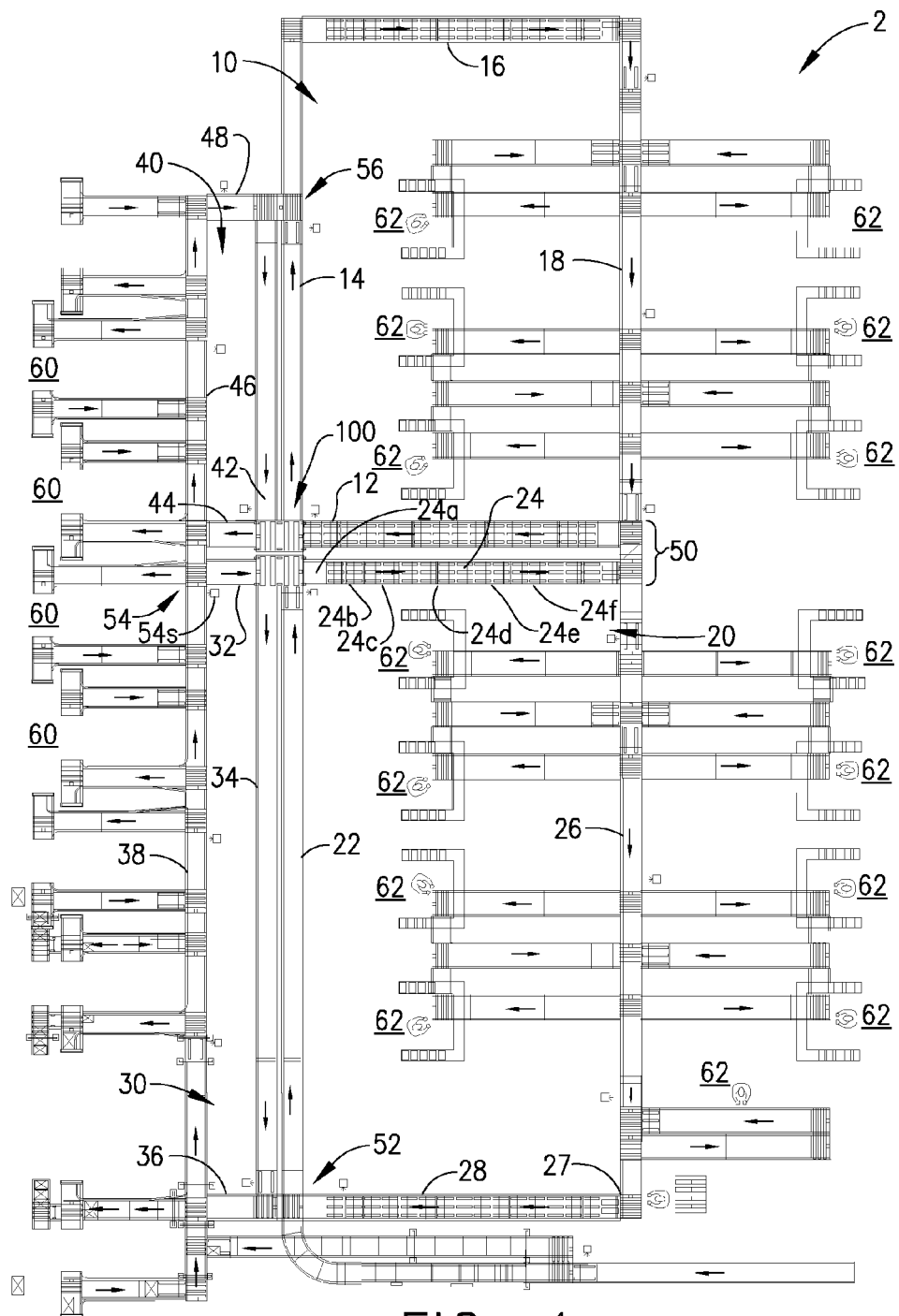
FIG. 1 is a diagrammatic plan view of a material handling subsystem having intersecting conveyor lines configured in accordance with the teachings of the present invention.

Reference will now be made in detail to one or more embodiments illustrated in the accompanying drawings.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations.

Figure 2:
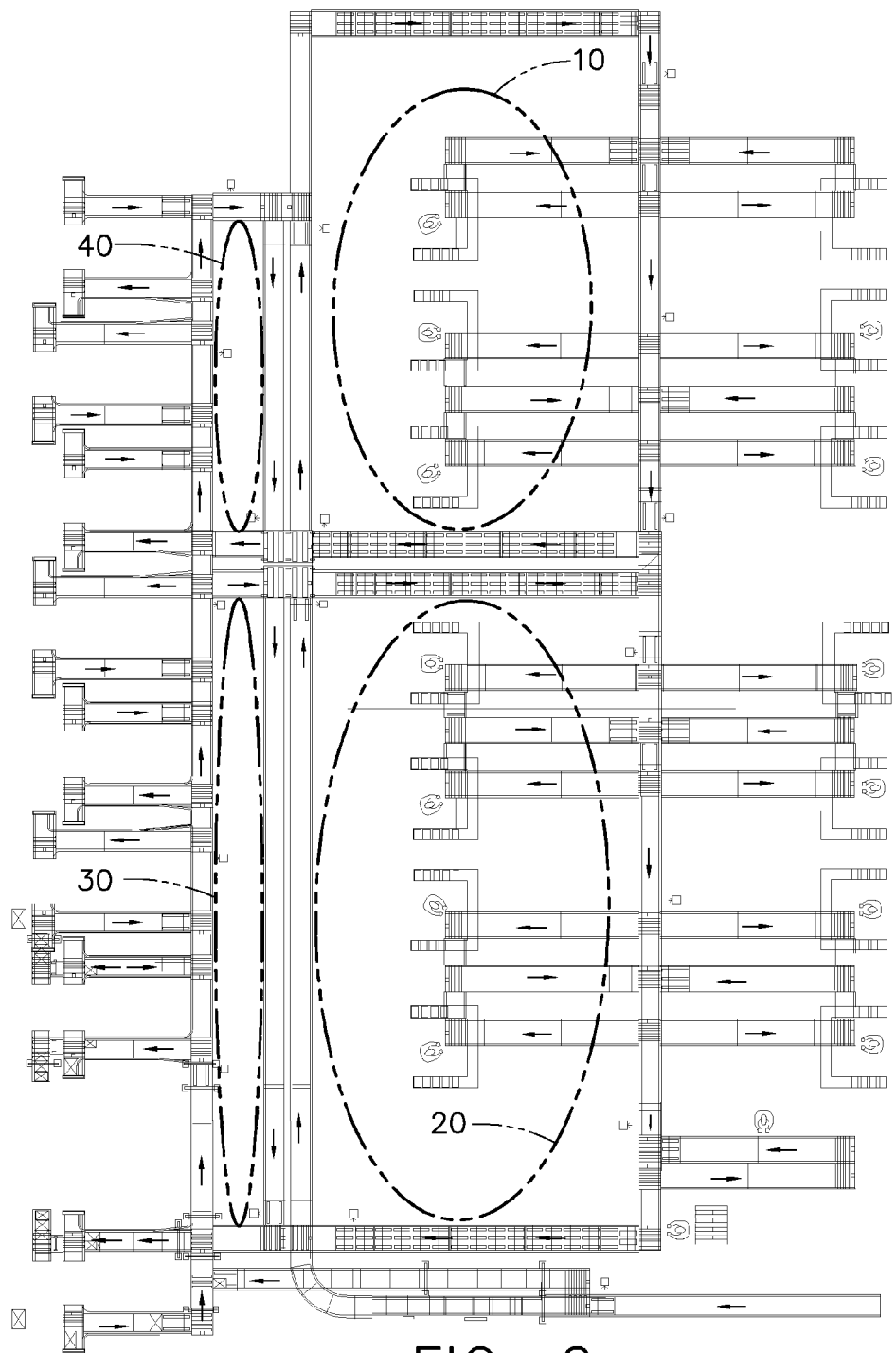
FIG. 2 is the same as FIG. 1, illustrating conveying loops of the material handling subsystem.

Referring to FIGS. 1 and 2, material handling subsystem 2 includes a plurality of conveyors 12, 14, 16, 18, 22, 24, 26, 28, 32, 34, 36, 38, 42, 44, 46 and 48, which form conveying loops 10, 20, 30 and 40, conveying articles in the direction indicated. As used herein, articles includes any type of item being conveyed, including for example, totes, cartons or individual products. Each such conveyor may be configured in any suitable way, such as being comprised of a plurality of aligned individual conveyor zones or conveyor sections, as is diagrammatically illustrated. Such individual conveyor zones may be individually controllable motor driven roller (MDR) conveyors of any suitable length. Although the conveyors are illustrated as connecting with each other at 90° right angle transfers, such as at 27, the sides may connect together in any suitable way, such as through curved conveyors. Additionally, aspects of the present innovation may be practiced without conveyors 12, 14, 16, 18, 22, 24, 26, 28, 32, 34, 36, 38, 42, 44, 46 and 48 being arranged in conveying loops 10, 20, 30 and 40.

As shown in FIGS. 1 & 2, conveying loops 10, 20, 30, 40 intersect with each other at routing module 100. Conveying loops 10, 20, 30, 40 may connect together in other locations, such as at respective pairs of right angle transfer conveyors 50, 52, 54, 56, allowing articles to be transferred from one loop to another besides at routing module 100.

Individual loops may connect with a plurality of other conveyors and subsystems. For example, loops 30 and 40 may be configured to discharge articles to and receive articles from conveyors that serve cranes, such as indicated at 60, of an automated storage and retrieval system. Another configuration is shown with loops 10 and 20 serving operator interfaces, such as put cells, pick cells or rework cells involving humans, as indicated at 62.

Figure 3:
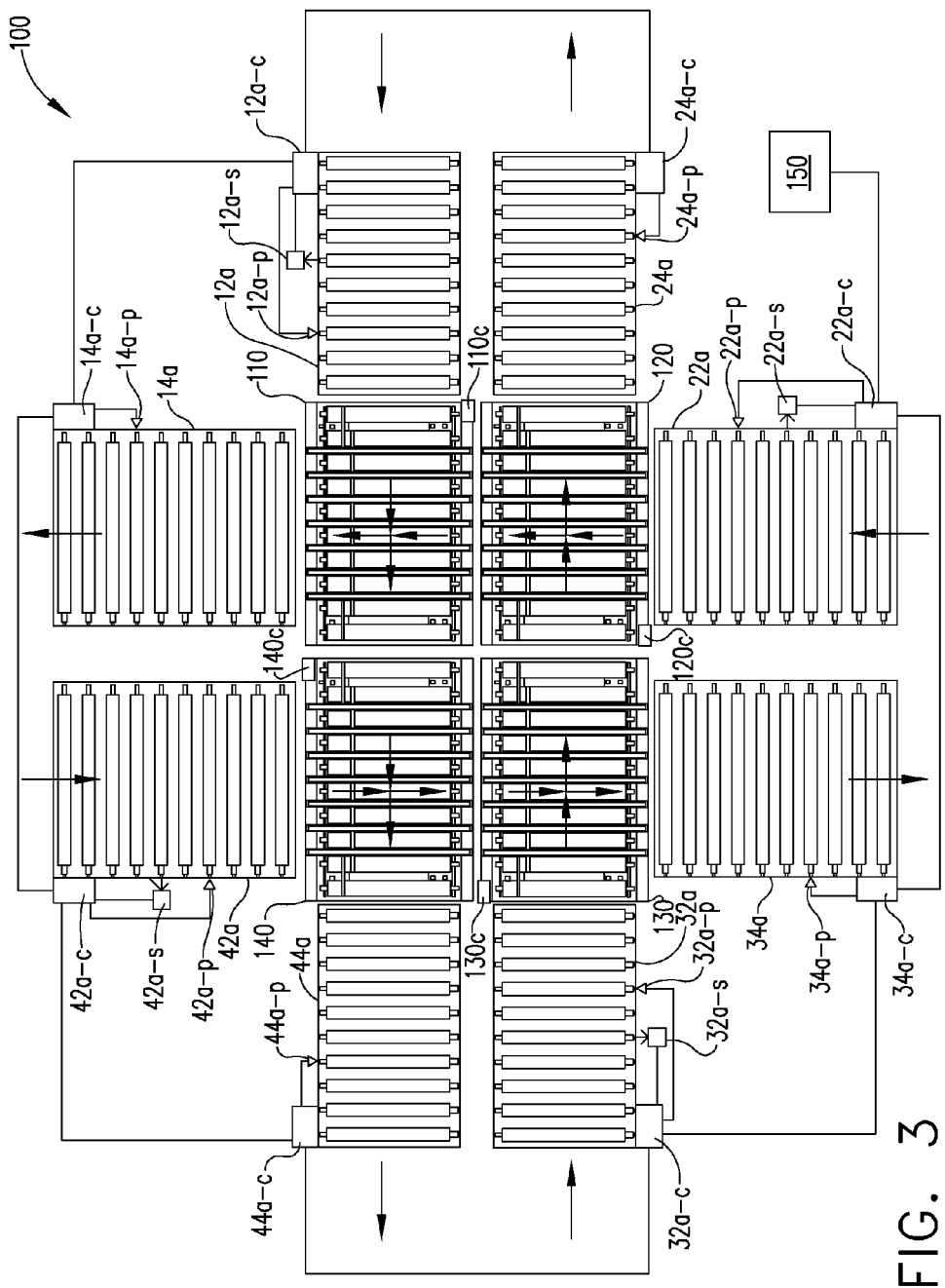
FIG. 3 is a diagrammatic illustration of a routing module of the material handling subsystem of FIG. 1 connecting four infeed conveyors and four discharge conveyors.

FIG. 3 diagrammatically illustrates routing module 100 intersection of material handling subsystem 2. Routing module 100 is configured to receive articles from four infeed conveyor zones 12a, 22a, 32a, 42a of conveyors 12, 22, 32, 42, respectively, and to discharge articles to any of four discharge conveyor zones 14a, 24a, 34a, 44a of conveyors 14, 24, 34, 44, respectively. Routing module 100 comprises transfer conveyors 110, 120, 130, 140, which in the embodiment depicted are configured identically as standard MDR transfer beds. Each transfer conveyor 110, 120, 130, 140 is a zone within routing module 100. Generally, transfer conveyors 110, 120, 130, 140 of routing module 100 are configured to receive articles from respective conveyors external to routing module 100 and from respective conveyors internal to routing module 100, and to discharge articles to respective conveyors external to routing module 100 and to respective conveyors internal to routing module 100, as indicated by the directional arrows, and as more specifically described below. Routing module 100 may include one or more article presence sensors disposed at suitable locations.

In the embodiment depicted, routing module 100 is a "quad" routing module, having four transfer conveyors. Although four transfer conveyors configure efficiently together as shown, practice of the present invention is not limited to systems incorporating a quad routing module—a routing module may comprise fewer or more than four transfer conveyors, each having an associated upstream transfer conveyor and an associated downstream transfer conveyor. Additionally, while transfer conveyors 110, 120, 130, 140 are immediately adjacent each other, conveyors could be interposed therebetween, which could be configured as separate zones or as one zone with an associated transfer conveyor.

Routing module 100 is not limited to a transfer conveyor configuration, and may have any suitable configuration. For example routing module 100 may be comprised of omni-directional drives as described in U.S. Provisional Patent Application Ser. No. 61/718,564, filed on Oct. 25, 2012, the disclosure of which is incorporated herein by reference in its entirety. Reference is made to the arrangement of omni-directional drives shown in FIG. 18 of the '564 application. Although that configuration indicates only one infeed conveyor 200, other conveyors, such as 206, 210 and 214 could be configured as infeed conveyors. The configuration 218 may comprise dynamically defined zones, wherein the number and location of individual omni-directional drives that comprise a zone, and the zone's location can be dynamically changed to provide an efficient path for articles from an infeed conveyor to a discharge conveyor. For example, a zone essentially needs to be only as large as the article's footprint, with the zone having a path through the routing module that dictates the articles path therethrough.

For simplicity, only transfer conveyor 120 and its associated infeed conveyor zone 22a and discharge conveyor zone 24a will be discussed, it being understood that the description is applicable to the other transfer conveyors 110, 130, 140, associated infeed conveyor zones 12a, 32a, 42a and discharge conveyor zones 14a, 34a, 44a, in which the like components are like numbered. Applying the general description of the configuration of the transfer conveyors of routing module 100, transfer conveyor 120 is configured and disposed to receive articles from infeed conveyor zone 22a, which is external to routing module 100 and from its upstream transfer conveyor 130, which internal to routing module 100. Transfer conveyor 120 is configured and disposed to discharge articles to discharge conveyor zone 24a, which is external to routing module 100 and to its downstream transfer conveyor 110, which internal to routing module 100. Thus, transfer conveyor 110 has an associated upstream transfer conveyor 130 and an associated downstream transfer conveyor 110.

Infeed conveyor zone 22a is depicted as a roller conveyor driven by a motorized drive roller (MDR), although any suitable drive arrangement may be used. Infeed conveyor zone 22a includes scanner 22a-s, article presence sensor 22a-p, and associated zone control module 22a-c. In the embodiment depicted, sensor 22a-p is a photo eye with a reflector, although any suitable sensor may be used, such as roller sensors or diffused scan sensors. The position and orientation of sensor 22a-p, also referred to herein as a photo eye, and scanner 22a-s within infeed conveyor zone 22a were selected based on the system parameters, such as length or type of packages. Any suitable location may be used.

As is known, zone control module 22a-c may control more than one zone, and may be connected directly to controller 150, or may be daisy chained together with other zone control modules and the chain connected to controller 150 as depicted in FIG. 3. Zone control module 22a-c receives instructions from controller 150, and executes resident instructions in controlling the movement of an article on infeed conveyor zone 22a. Sensor 22a-p is depicted as connected to zone control module 22a-c, as is zone control module 22a-c.

Controller 150 which may have one or more processors, comprises at least part of a processing system which executes instructions to control routing module 100. Controller 150 may also execute instructions to control material handling subsystem 2 or may control the entire material handling system. The present invention is not constrained to a certain I/O scheme, networking methodology, architecture or centralized processing.

Transfer conveyor 120 may be of any configuration which is capable of conveying articles as described. Transfer conveyor 120 includes zone control module 120-c, which may be daisy chained to other zone control modules and connected to controller 150, or may be connected directly to controller 150. Zone control module 120-c receives instructions from controller 150, and executes resident instructions in controlling the movement of an article on transfer conveyor 120. Transfer conveyor 120 may include an article presence sensor (not shown).

Discharge conveyor zone 24a is depicted as a roller conveyor driven by a MDR, although any suitable drive arrangement may be used. Discharge conveyor zone 24a includes article presence sensor 24a-p, and zone control module 24a-c. Any suitable position and orientation of sensor 24a-p may be used. Zone control module 24a-c may control more than one zone, and may be connected directly to controller 150, or may be daisy chained together with other zone control modules as depicted in FIG. 3. Zone control module 24a-c receives instructions from controller 150, and executes resident instructions in controlling the movement of an article on discharge conveyor zone 24a.

When an article reaches infeed conveyor zone 22a, it will be scanned by scanner 22a-s and its position sensed by sensor 22a-p. The scanned information about the article will be transmitted to controller 150. Controller 150 will determine when to release the article, based on execution of the logic described below. When it is time to release the article, controller 150 will instruct zone control module 22a-c to release the article and indicate the discharge destination of routing module 100 that the article is to be conveyed. Zone control module 22a-c will execute instructions to discharge the article onto transfer conveyor 120, and the article will be discharged. Zone control module 120c will then execute instructions to convey the article either to discharge conveyor zone 24a or to the associated downstream transfer conveyor 110.

If the article is transferred to discharge conveyor zone 24a, zone control module 24a-c will execute instructions to convey the article downstream on conveyor 24, in accordance with the set of control instructions applicable to conveyor 24. In the embodiment depicted, conveyor 24 comprises a plurality of individual MDR zones, each with a article presence sensor and zone control module (or a shared zone control module), with each zone control module executing a standard set of instructions for advancing the article in the downstream direction.

If the article is transferred to transfer conveyor 110, zone control module 110c will then execute instructions, as determined by controller 150, to convey the article either to discharge conveyor zone 14a or to the associated downstream conveyor 140. If the article is transferred to discharge conveyor zone 14a, zone control module 14a-c will execute instructions to convey the article downstream on conveyor 14, in accordance with the set of control instructions applicable to conveyor 14. In the embodiment depicted, conveyor 14 comprises a plurality of individual MDR zones, each with a article presence sensor and zone control module (or a shared zone control module), with each zone control module executing a standard set of instructions for advancing the article in the downstream direction.

If the article is transferred to transfer conveyor 140, zone control module 140c will then execute instructions, as determined by controller 150, to convey the article either to discharge conveyor zone 44a or to the associated downstream conveyor 130. If the article is transferred to discharge conveyor zone 44a, zone control module 44a-c will execute instructions to convey the article downstream on conveyor 44, in accordance with the set of control instructions applicable to conveyor 44. In the embodiment depicted, conveyor 44 comprises a plurality of individual MDR zones, each with a article presence sensor and zone control module (or a shared zone control module), with each zone control module executing a standard set of instructions for advancing the article in the downstream direction.

If the article is transferred to transfer conveyor 130, zone control module 130c will then execute instructions, as determined by controller 150, to convey the article to discharge conveyor zone 34a. The control logic is configured not to release an article into routing module 100 if it will not be discharged before returning to its entrance transfer conveyor. Zone control module 34a-c will execute instructions to convey the article downstream on conveyor 34, in accordance with the set of control instructions applicable to conveyor 34.

In the embodiment depicted, conveyor 34 comprises a plurality of individual MDR zones, each with a article presence sensor and zone control module (or a shared zone control module), with each zone control module executing a standard set of instructions for advancing the article in the downstream direction.

Figure 4:
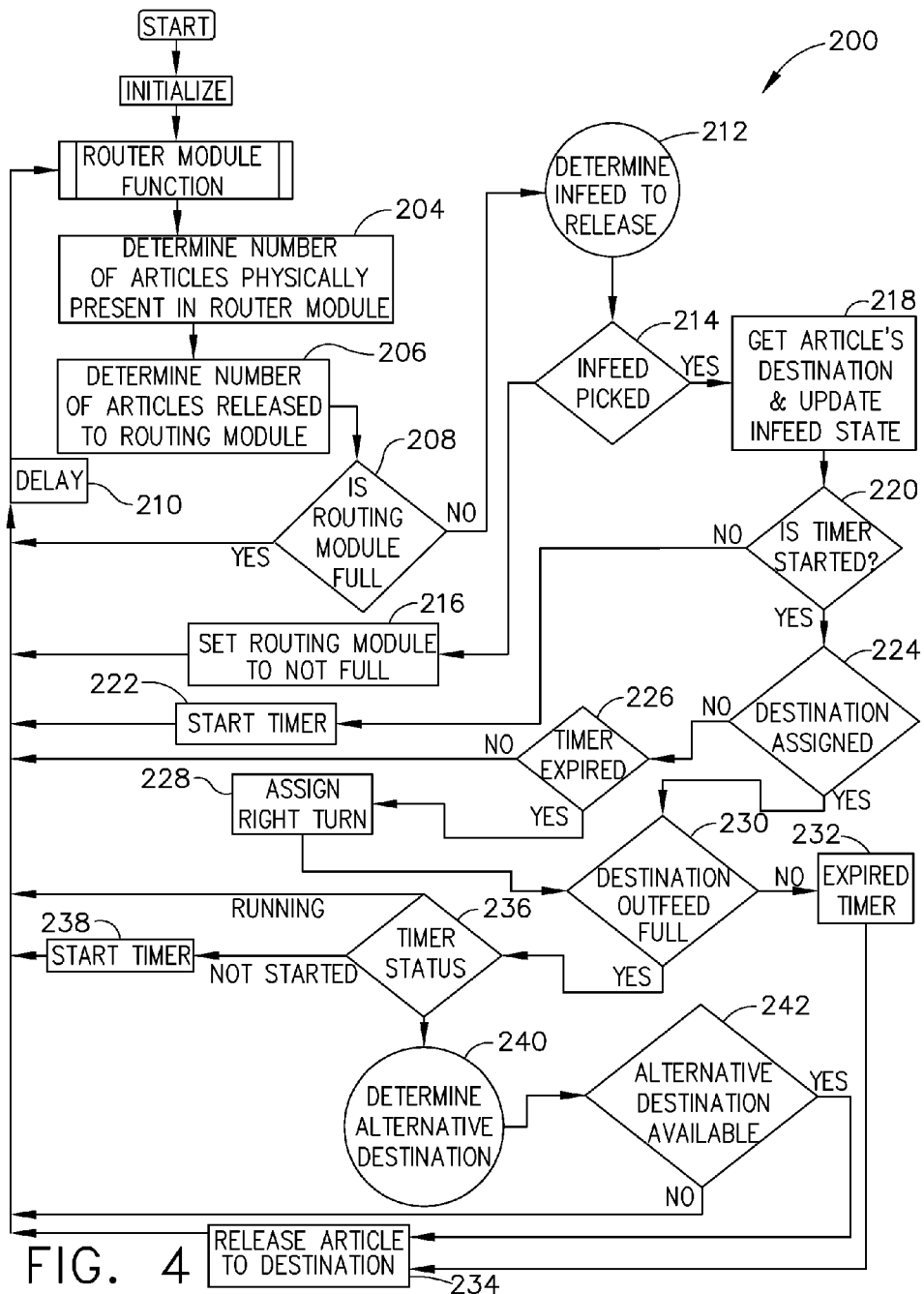
FIGS. 4, 5 and 6 illustrate a flow diagram of control functionality logic according to one embodiment.

Referring to FIG. 4, there is shown control logic 200, which directs the operation of routing module 100. Control logic 200 determines which infeed conveyor zone 12a, 22a, 32a, 42a to release and when, and passes instructions to the zone control module of the released zone. Information about the destination and path of the released article is passed with the article to each successive zone, including the routing module zones (in the embodiment depicted, transfer conveyors 110, 120, 130, 140).

Control logic 200 may be executed every scan, about every 25 millisecond. At block 204, the number of articles physically present in routing module 100 is determined. At block 206, the number of articles that have been released to, but are not physically present in, routing module 100 is determined. At block 208, the logic determines whether routing module 100 is full, which is indicative of whether there is space available for an additional article on routing module 100. Routing module 100 is full if the total number of articles physically present in routing module 100 and articles released to routing module 100 is 3, which in the embodiment depicted is one less than the number of zones that comprise routing module 100. If routing module 100 is determined at block 208 to be full, the logic proceeds to block 210 where a predetermined delay period must pass before starting the next scan. The delay period may be set to zero.

If routing module 100 is not full, then at block 212 the function illustrated in FIG. 5, discussed below, is called to determine whether there is an infeed conveyor zone 12a, 22a, 32a, 42a that can be picked for release to routing module 100. The function illustrated in FIG. 5 returns to block 214 with an indication whether an infeed conveyor zone has been picked for release. If not, the control logic proceeds to block 216, where a routing module parameter is set to not full, and then proceeds to the block 210 delay.

If an infeed conveyor zone has been picked, then at block 218 the article's final destination is retrieved by the logic. The article is scanned proximal routing module 100, identifying the article allowing the article's final destination to be looked up. In the depicted embodiment, scanning is done at infeed conveyor zones 12a, 22a, 32a, 42a. It is noted that as shown in FIG. 1, because of the proximity of scanner 54s, immediately upstream of right angle transfer conveyor 54, to routing module 100, scanner 32a-s may be omitted. Controller 150 includes a database table that associates each final destination with a respective map from its location at routing module 100, which provides a path through routing module 100 starting from a particular infeed conveyor zone. Thus, identification of the article provides the article's final destination, which allows control logic 200 to determine the articles path through routing module 100. Also at block 218, the infeed state is updated. In the depicted embodiment, there are three infeed state settings: idle, indicating the infeed conveyor zone does not have an article; has article; and has an outfeed destination, which is one of discharge conveyors 14a, 24a, 34a, 44a, thereby defining the article's path through routing module 100.

At block 220, control logic 200 examines whether the timer for the selected infeed conveyor zone is already started. Each infeed conveyor zone has a respective timer, which may be used in a gridlock avoidance system, as discussed below. If the infeed conveyor zone timer has not already been started, it is started at block 222 and the control proceeds to the block 210 delay.

If the infeed conveyor zone timer has already started, at block 224 it is determined whether the article has an outfeed destination assigned. If it does not, then control passes to block 226 where the timer status is examined. If the timer is not expired, indicating that within the parameters of control logic 200, the article may continue to wait on its infeed conveyor zone to be released, and the control proceeds to the block 210 delay.

If the timer has expired, the control proceeds to block 228 and a right turn is assigned to the article. A right turn, in the depicted embodiment, is the shortest path through routing module 100, which would convey the article into one of loops 10, 20, 30, 40, depending on which infeed conveyor zone the articles was on. If a right turn does not place the article on the path to its final destination, the article may follow the respective loop and return to routing module 100. Holding the article on a infeed conveyor zone will impede the progress of articles upstream of it. Such upstream articles may need to follow a different path through routing module 100, one which is or could be available for release.

After assigning a right turn at block 228, or if an outfeed destination is determined to have been assigned at block 224, control logic 200 proceeds to block 230 where the control looks ahead to the availability of the conveyor downstream of routing module 100 for the article's assigned outfeed destination. This evaluation of the state of the zones downstream of discharge conveyors provides the capability of releasing an article to routing module 100 even when the article's discharge conveyor is occupied at the time the release command is given. An example of an algorithm to evaluate the state of the downstream zones is to determine the destination outfeed is full if more than x of the next y conveyors have articles on them. For example, FIG. 1 illustrates zone conveyors 24a, 24b, 24c, 24d, 24e and 24f downstream of routing module 100. An evaluation could classify the destination outfeed as full if more than four of the six zone conveyors have articles. Another approach would be if more than five of the six zone conveyors have articles.

If at block 230, it is determined that the destination outfeed is not full, the control passes to block 232 and that infeed conveyor zone's timer is expired. The control proceeds to block 234 where the article is released. When released, control logic 200 instructs the zone control module of the appropriate infeed conveyor zone to release and the zone control module effects the movement of the article following the zone control module's control algorithm, typically waiting for the immediate downstream zone to be clear, then passing information and control to that zone's zone control module. Control logic 200 next proceeds to the block 210 delay.

If at block 230, the destination outfeed is determined to be full, the timer status is checked at block 236. If at block 236 the infeed conveyor zone's timer is running (not expired), the control proceeds to the block 210 delay. If the infeed conveyor zone's timer has not started, the timer is started at block 238. If at block 230, the infeed conveyor zone's timer is determined to have expired, control proceeds to block 240, where the function illustrated in FIG. 6, discussed below, is called to determine whether an alternative destination is available.

Figure 6:
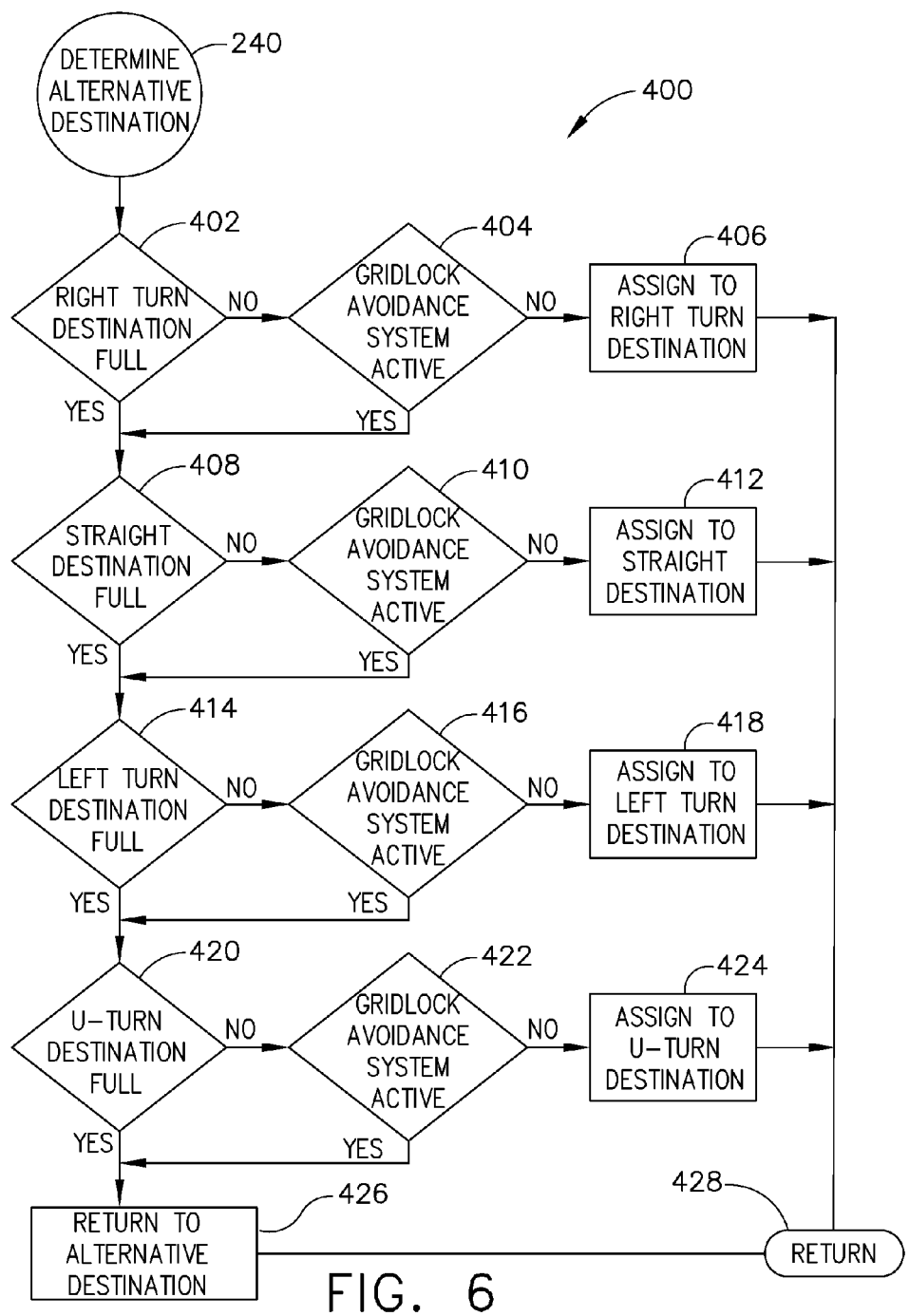

The function illustrated in FIG. 6 returns to block 242. If an alternative destination is available, the control proceeds to block 234 and releases the article to that alternative destination. If an alternative destination is not determined to be available, control logic 200 proceeds to the block 210 delay.

Figure 5:
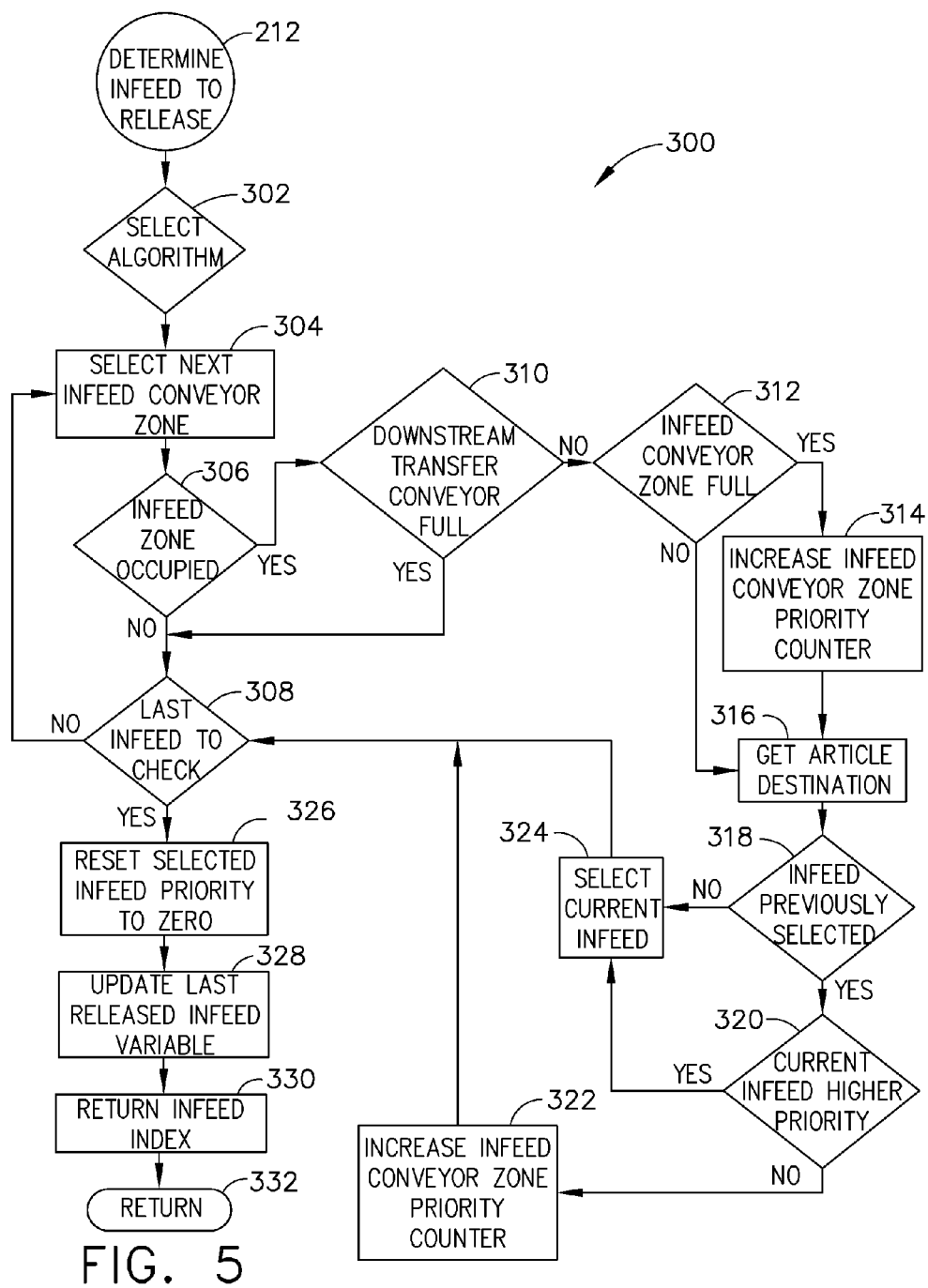

Referring to FIG. 5, the control logic of block 212 is described, generally indicated at 300. The algorithm is selected at block 302. There are numerous methodologies and criteria for determining which feed zone conveyor to release. Examples include first in, first out, amount of time waiting, type of article, destination of article, infeed conveyor zone. A round robin approach could be used, starting with a selected infeed conveyor zone and proceeding in a direction, such as clockwise, and designating the first infeed conveyor zone reached which has a destination and the destination outfeed is not full. More than one algorithm may be included within control logic 200, selectable by a user. An algorithm may have selectable parameters. Practice of the present invention is not dependent on a specific algorithm, although one such example is discussed.

FIG. 5 illustrates an algorithm, selected at block 302. At block 304, the control selects the next infeed conveyor zone to consider. There are many different ways to select the first infeed conveyor zone to examine, each time this function is called at block 212. It may start at the next successive infeed conveyor zone in a clockwise (or even counter clockwise) direction, or it may start based on the last infeed conveyor zone to be released, such as based on the last released infeed variable updated at block 328. Each infeed conveyor zone is examined by function 300 before a infeed conveyor zone is selected.

At block 306, it is determined whether the infeed conveyor zone being considered has an article. If it does not, the control progresses to block 308, and returns to block 304 if all infeed conveyor zones have not been considered.

If the infeed conveyor zone is occupied, then at block 310 it is determined whether the transfer conveyor downstream of the infeed conveyor zone is full. It may be considered full if it is occupied by an article, or if the immediately upstream transfer conveyor of routing module 100 has begun releasing an article to the transfer conveyor. If the downstream transfer conveyor is full, the control progresses to block 308, and returns to block 304 if all infeed conveyor zones have not been considered.

If at block 310 the downstream transfer conveyor is not full, then the fullness of the conveyor upstream of the infeed conveyor zone is considered at block 312. One way of evaluating the upstream fullness is examining how many zones of a certain number of upstream zones are occupied. For example seventeen upstream zones could be considered, and the infeed conveyor could be designated as full if twelve or more of them are occupied. This x of the next y occupied methodology could be user selectable, allowing operation of the system to be adjusted by user input.

If the conveyor upstream of the infeed conveyor zone is considered full at block 312, the infeed conveyor zone's priority counter is increased by one at block 314, and control passes to block 316. If the conveyor upstream of the infeed conveyor zone is not considered full at block 312, control passes directly to block 316. At block 316, the article destination may optionally be obtained, which would allow the destination outfeed to be considered also, as at block 230 above. However, since the destination outfeed is examined as part of the router module function, it may be omitted from logic 300.

Control passes to block 318 where control logic 300 determines if an infeed conveyor zone was previously selected for release since the start of the iterations at block 304. If one has been, then at block 320 the priority of the previously selected infeed conveyor zone is compared to the infeed conveyor zone currently being considered. If the infeed conveyor zone currently being considered has a lower priority, the logic proceeds to block 322 and the priority of the infeed conveyor zone currently being considered is increased, and the control logic progresses to block 308 and returns to block 304 if all infeed conveyor zones have not been considered.

If the infeed conveyor zone currently being considered has the higher priority at block 320, then it is selected to be released at block 324, and the control logic progresses to block 308, and returns to block 304 if all infeed conveyor zones have not been considered.

Once all the infeed conveyor zones have been checked, the control logic proceeds from block 308 to block 326, where the priority counter of the selected infeed is set to zero, if one has been selected. Next, at block 328 the last released variable is updated, providing a potential starting point for block 304 when logic 300 is next executed. At block 330, logic 300 returns a value for the infeed index which indicates which infeed conveyor zone was selected. If none is selected, block 330 returns an index value indicative that none has been selected.

Referring to FIG. 6, an example of control logic of block 240 to determine an alternative destination for an article is described, generally indicated at 400. Control logic 400 may use many different algorithms for selecting an alternative destination for an article, and practice of the present invention is not limited any particular algorithm. The goal is to advance an article which has been at an infeed conveyor zone too long (e.g. the timer has expired) out of the way so that subsequent articles may be advanced. As seen in FIG. 6, at block 402 it is considered whether a right turn destination is available. At least the right turn discharge conveyor is examined to see if it is occupied. At block 402, the state of the downstream zones could also be evaluated, similar to block 230 described above. If the right turn destination is determined not to be full at block 402, the control proceeds to block 404, where it is determined whether the gridlock avoidance system is active for the particular lane. If it is not, then at block 406 the right turn destination is assigned to the infeed conveyor zone and proceeds to block 428 where the logic returns to block 242.

If the right turn destination is determined to be full at block 402 or the lane's gridlock avoidance system is determined to be active at block 404, the control proceeds to block 408 where it is considered whether a straight destination is available for the infeed conveyor zone. At least the straight ahead discharge conveyor is examined to see if it is occupied. By way of example, discharge conveyor zone 14a in FIG. 3 is the straight ahead destination for infeed conveyor zone 22a. At block 408, the state of the straight ahead downstream zones could also be evaluated, similar to block 230 described above. If the straight destination is determined not to be full at block 408, the control proceeds to block 410, where it is determined whether the gridlock avoidance system is active for the particular lane. If it is not, then at block 412 the straight ahead destination is assigned to the infeed conveyor zone and proceeds to block 428 where the logic returns to block 242.

If the straight ahead destination is determined to be full at block 408 or the lane's gridlock avoidance system is determined to be active at block 410, the control proceeds to block 414 where it is considered whether a left turn destination is available for the infeed conveyor zone. At least the left turn discharge conveyor is examined to see if it is occupied. By way of example, discharge conveyor zone 44a in FIG. 3 is the left turn destination for infeed conveyor zone 22a. At block 414, the state of the left turn downstream zones could also be evaluated, similar to block 230 described above. If the left turn destination is determined not to be full at block 414, the control proceeds to block 416, where it is determined whether the gridlock avoidance system is active for the particular lane.

If it is not, then at block 418 the left turn destination is assigned to the infeed conveyor zone and proceeds to block 428 where the logic returns to block 242.

If the left turn destination is determined to be full at block 414 or the lane's gridlock avoidance system is determined to be active at block 416, the control proceeds to block 420 where it is considered whether a U-turn destination is available for the infeed conveyor zone. At least the U-turn discharge conveyor is examined to see if it is occupied. By way of example, discharge conveyor zone 34a in FIG. 3 is the U-turn destination for infeed conveyor zone 22a. At block 420, the state of the left turn downstream zones could also be evaluated, similar to block 230 described above. If the left turn destination is determined not to be full at block 420, the control proceeds to block 422, where it is determined whether the gridlock avoidance system is active for the particular lane. If it is not, then at block 424 the left turn destination is assigned to the infeed conveyor zone and proceeds to block 428 where the logic returns to block 242.

If the U-turn destination is determined to be full at block 420 or the lane's gridlock avoidance system is determined to be active at block 422, the control proceeds to block 426, where no alternative destination available is returned and proceeds to block 428 where the logic returns to block 242.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executions instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

EXPLICIT DEFINITIONS

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

A statement that a processing system is "configured" to perform one or more acts means that the processing system includes data (which may include instructions) which can be used in performing the specific acts the processing system is "configured" to do. For example, in the case of a computer (a type of "processing system") installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

The foregoing description has been presented for purposes of illustration and description. It is not intended to be exhaustive or to limit the invention to the precise form disclosed. Obvious modifications or variations are possible in light of the above teachings. The embodiment was chosen and described in order to illustrate the principles of the invention and its application to thereby enable one of ordinary skill in the art to utilize the invention in various embodiments and with various modifications as are suited to the particular use contemplated. Although only a limited number of embodiments of the invention is explained in detail, it is to be understood that the invention is not limited in its scope to the details of construction and arrangement of components set forth in the preceding description or illustrated in the drawings. The invention is capable of other embodiments and of being practiced or carried out in various ways. Also, specific terminology was used herein for the sake of clarity. It is to be understood that each specific term includes all technical equivalents which operate in a similar manner to accomplish a similar purpose. It is intended that the scope of the invention be defined by the claims submitted herewith.

The invention claimed is:
1. A method comprising;
controlling a routing module comprising a plurality of conveying zones each having an associated zone control module and configured to receive articles from a plural- ity of infeed conveyor zones and to discharge the articles to any of a plurality of discharge conveyor zones toward each respective article's final destination;
determining whether there is space on said routing module for an additional article;
selecting an infeed conveyor zone to release its associated article therefrom to a designated discharge conveyor zone associated with said associated article's final destination;
determining whether conveyors downstream of the designated discharge conveyor zone are considered full; and
releasing said associated article to said routing module.

2. The method according to claim 1, wherein selecting an infeed conveyor zone to release comprises determining whether any of said plurality of infeed conveyor zones can be picked to release.

3. The method according to claim 2, wherein selecting an infeed conveyor zone to release comprises determining whether an area of the routing module which would receive an article from a picked infeed conveyor zone is considered full.

4. The method of claim 2, wherein selecting an infeed conveyor zone to release comprises determining whether upstream of the infeed conveyor zone is considered full.

5. The method of claim 2, wherein selecting an infeed conveyor zone to release comprises starting a timer.

6. The method of claim 5, comprising, if the timer has expired, determining whether an alternative destination is available.

7. A material handling system for conveying articles to respective final destinations, said material handling system comprising:
a plurality of infeed conveying zones configured to convey articles;
a plurality of discharge conveying zones configured to convey articles;
a routing module configured to receive articles from any of said plurality of infeed conveyor zones and to discharge the articles to any of said plurality of discharge conveyor zones toward each respective article's final destination, said routing module comprising a plurality of conveying zones each having an associated zone control module; and
a controller in communication with said routing module, wherein said controller comprises at least one processor that executes instructions to cause said routing module to perform operations comprising determining whether there is space on said routing module for an additional article, selecting an infeed conveyor zone to release its associated article therefrom to a designated discharge conveyor zone associated with said associated article's final destination, determining whether conveyors downstream of the designated discharge conveyor zone are considered full, and releasing said associated article to said routing module.

8. The material handling system according to claim 7, wherein said operation of selecting an infeed conveyor zone to release comprises determining whether any of said plurality of infeed conveyor zones can be picked to release.

9. The material handling system according to claim 7, wherein said operation of selecting an infeed conveyor zone to release comprises determining whether an area of the routing module which would receive an article from a picked infeed conveyor zone is considered full.

10. The material handling system according to claim 7, wherein said operation of selecting an infeed conveyor zone to release comprises determining whether upstream of the infeed conveyor zone is considered full.

11. The material handling system according to claim 7, wherein said operation of selecting an infeed conveyor zone to release comprises starting a timer.

12. The material handling system according to claim 11, wherein said operations comprise, if the timer has expired, determining whether an alternative destination is available.

13. A controller for controlling a material handling system comprising a plurality of infeed conveying zones configured to convey articles, a plurality of discharge conveying zones configured to convey article, the controller comprising:
at least one processor that executes instructions to cause said routing module to perform operations comprising:
controlling a routing module configured to receive articles from any of said plurality of infeed conveyor zones and to discharge the articles to any of said plurality of discharge conveyor zones toward each respective article's final destination, said routing module comprising a plurality of conveying zones each having an associated zone control module;
determining whether there is space on said a routing module for an additional article;
selecting an infeed conveyor zone to release its associated article therefrom to a designated discharge conveyor zone associated with said associated article's final destination;
determining whether conveyors downstream of the designated discharge conveyor zone are considered full; and
releasing said associated article to said routing module.

14. The material handling system according to claim 13, wherein said operation of selecting an infeed conveyor zone to release comprises determining whether any of said plurality of infeed conveyor zones can be picked to release.

15. The material handling system according to claim 13, wherein said operation of selecting an infeed conveyor zone to release comprises determining whether an area of the routing module which would receive an article from a picked in feed conveyor zone is considered full.

16. The material handling system according to claim 13, wherein said operation of selecting an infeed conveyor zone to release comprises determining whether upstream of the infeed conveyor zone is considered full.

17. The material handling system according to claim 13, wherein said operation of selecting an infeed conveyor zone to release comprises starting a timer.

18. The material handling system according to claim 17, wherein said operations comprise, if the timer has expired, determining whether an alternate destination is available.

19. A material handling system for conveying articles to respective final destinations, said material handling comprising:
a plurality of infeed conveying zones configured to convey articles;
a plurality of discharge conveying zones configured to convey articles;
a routing module configured to receive articles from any of said plurality of infeed conveyor zones and to discharge the articles to any of said plurality of discharge conveyor zones toward each respective article's final destination, said routing module comprising a plurality of conveying zones, each respective conveying zone having an associated infeed conveying zone of said plurality of infeed conveying zones configured to discharge articles to said respective conveying zone; an associated discharge zone of said plurality of discharge zones, said respective conveying zone configured to discharge articles to said associated discharge zone;

an associated upstream conveying zone of said plurality of conveying zones configured to discharge articles to said respective conveying zone; and an associated downstream conveying zone of said plurality of conveying zones, said respective conveying zone configured to discharge articles to said associated downstream conveying zone.

20. The material handling conveyor of claim 19, wherein each conveying zone of said plurality of conveying zones comprises a right angle transfer conveyor.

21. The material handling conveyor of claim 19, comprising a plurality of conveying loops, each said conveying loop comprising a respective one of said infeed conveying zones and a respective one of said discharge conveying zones, said plurality of conveying loops intersecting with each other at said routing module such that articles may be transferred from one conveying loop to any other conveying loop at said routing table.

* * * * *